United States Patent
Nishimura

(10) Patent No.: US 11,408,146 B2
(45) Date of Patent: Aug. 9, 2022

(54) WORK MACHINE AND METHOD FOR CONTROLLING THE SAME

(71) Applicant: KOMATSU LTD., Tokyo (JP)

(72) Inventor: Minetaka Nishimura, Tokyo (JP)

(73) Assignee: KOMATSU LTD., Tokyo (JP)

( * ) Notice: Subject to any disclaimer, the term of this patent is extended or adjusted under 35 U.S.C. 154(b) by 278 days.

(21) Appl. No.: 16/482,442

(22) PCT Filed: Apr. 24, 2018

(86) PCT No.: PCT/JP2018/016561
§ 371 (c)(1),
(2) Date: Jul. 31, 2019

(87) PCT Pub. No.: WO2018/199069
PCT Pub. Date: Nov. 1, 2018

(65) Prior Publication Data
US 2020/0040554 A1 Feb. 6, 2020

(30) Foreign Application Priority Data

Apr. 28, 2017 (JP) .............................. JP2017-090611

(51) Int. Cl.
| | |
|---|---|
| *E02F 9/22* | (2006.01) |
| *E02F 9/26* | (2006.01) |
| *E02F 3/43* | (2006.01) |
| *F15B 11/20* | (2006.01) |

(52) U.S. Cl.
CPC ............ *E02F 9/2246* (2013.01); *E02F 9/264* (2013.01); *E02F 3/43* (2013.01); *E02F 9/2235* (2013.01); *F15B 11/20* (2013.01); *F15B 2211/6355* (2013.01)

(58) Field of Classification Search
CPC ... E02F 3/43; E02F 9/264; E02F 3/435; E02F 9/2029; E02F 9/2246
See application file for complete search history.

(56) References Cited

U.S. PATENT DOCUMENTS

| | | | |
|---|---|---|---|
| 5,052,883 A | 10/1991 | Morita et al. | |
| 6,050,090 A | 4/2000 | Tohji | |
| 6,072,127 A | 6/2000 | Oslakovic | |
| 6,736,216 B2 * | 5/2004 | Savard .................. | E01C 19/006 172/1 |
| 2005/0000703 A1 | 1/2005 | Furuno et al. | |
| 2009/0228394 A1 | 9/2009 | Mintah et al. | |
| 2011/0004378 A1 * | 1/2011 | Saito .................... | B60W 10/08 701/50 |

(Continued)

FOREIGN PATENT DOCUMENTS

| | | |
|---|---|---|
| CN | 1571872 A | 1/2005 |
| CN | 102037194 A | 4/2011 |

(Continued)

*Primary Examiner* — Abiy Teka
(74) *Attorney, Agent, or Firm* — Faegre Drinker Biddle & Reath LLP

(57) ABSTRACT

A work machine includes: a boom; a dipper stick attached to a distal end of the boom; a bucket attached to a distal end of the dipper stick; and a loading determination unit configured to determine that an operation of the work machine is a loading operation for loading an excavated matter into a loading target under a condition that the bucket moves across a reference level.

17 Claims, 8 Drawing Sheets

(56) References Cited

U.S. PATENT DOCUMENTS

| | | |
|---|---|---|
| 2011/0040459 A1 | 2/2011 | Takiguchi et al. |
| 2014/0330490 A1 | 11/2014 | Aoki et al. |
| 2017/0255895 A1 | 9/2017 | Kozumi et al. |
| 2018/0171594 A1 | 6/2018 | Tsuji et al. |
| 2018/0274210 A1 | 9/2018 | Nishimura et al. |

FOREIGN PATENT DOCUMENTS

| | | |
|---|---|---|
| CN | 107343381 A | 11/2017 |
| CN | 107532410 A | 1/2018 |
| JP | S62-274223 A | 11/1987 |
| JP | H08-019691 B2 | 2/1996 |
| JP | H10-72850 A | 3/1998 |
| JP | 2810060 B | 10/1998 |
| JP | WO2003/033829 A1 | 4/2003 |
| JP | 2006-077451 A | 3/2006 |
| JP | 2006-194823 A | 7/2006 |
| JP | 3830151 B2 | 10/2006 |
| JP | 2011-516755 A | 5/2011 |
| JP | 2012-36645 A | 2/2012 |
| JP | 2013-127187 A | 6/2013 |
| JP | 2014-173949 A | 9/2014 |
| JP | 2017-166232 A | 9/2017 |
| WO | WO-2009/116249 A1 | 9/2009 |
| WO | WO-2016/125915 A1 | 8/2016 |
| WO | WO-2017/033769 A1 | 3/2017 |
| WO | WO 2018/087834 A1 | 5/2018 |

\* cited by examiner

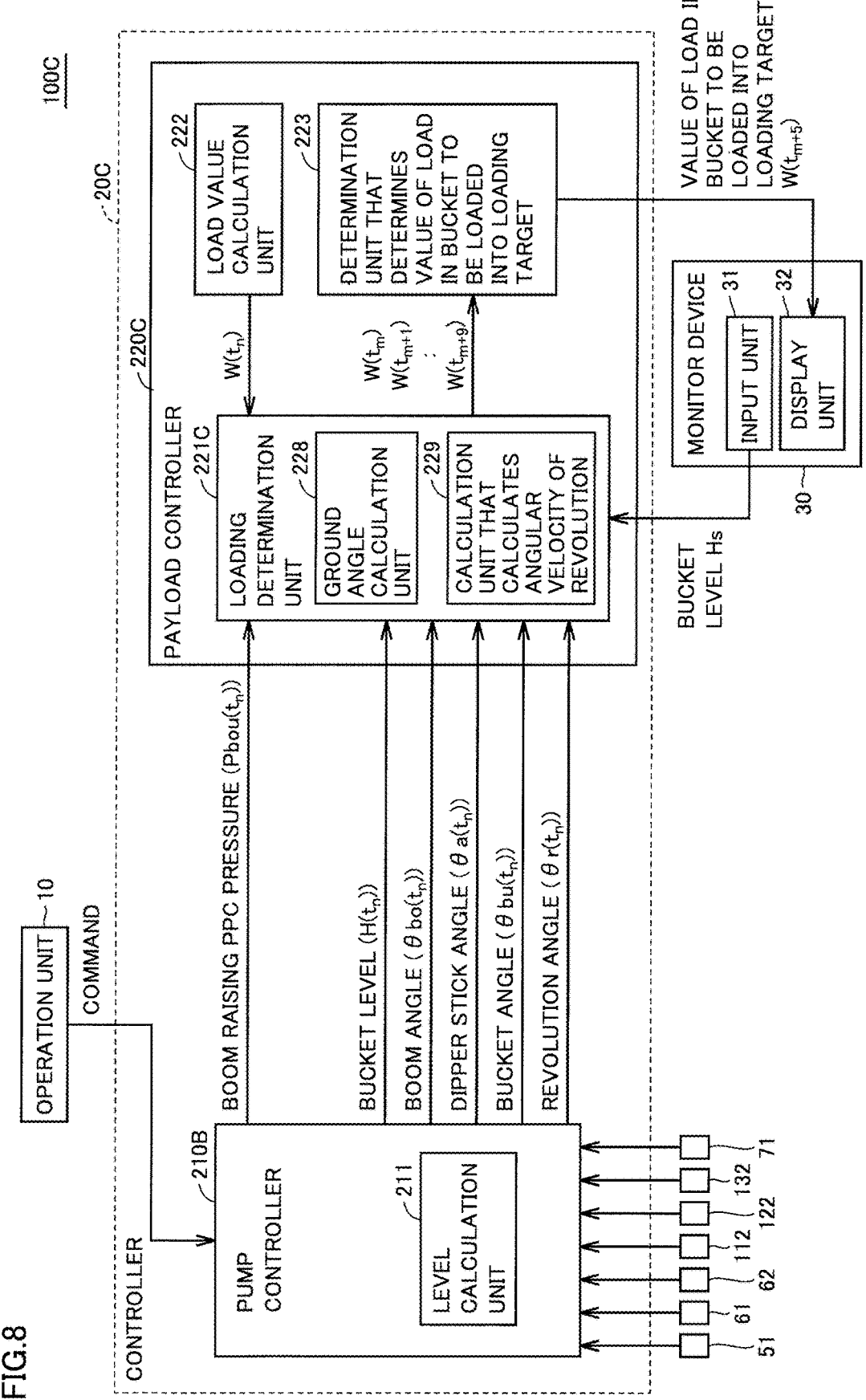

WORK MACHINE AND METHOD FOR CONTROLLING THE SAME

TECHNICAL FIELD

The present disclosure relates to a work machine and a method for controlling the same.

BACKGROUND ART

A work machine such as a hydraulic excavator loads into a loading target such as a dump truck an excavated matter excavated by a work implement that the work machine comprises.

A method for calculating the load of the excavated matter excavated by the work implement is disclosed, for example, in Japanese National Patent Publication No. 2011-516755 (PTL 1).

CITATION LIST

Patent Literature

PTL 1: Japanese National Patent Publication No. 2011-516755

SUMMARY OF INVENTION

Technical Problem

However, an operation of excavating soil by a work implement and ejecting the soil out of the bucket of the work implement is not necessarily an operation of loading the excavated matter into a dump truck etc. Accordingly, in order to accurately grasp the load of the excavated matter loaded in the dump truck or the like, it is preferable that the operation of loading into the loading target can be detected accurately.

An object of the present disclosure is to provide a work machine capable of accurately detecting an operation of loading into a loading target and a method for controlling the work machine.

Solution to Problem

According to one aspect of the present disclosure, a work machine comprises: a boom; a dipper stick attached to a distal end of the boom; a bucket attached to a distal end of the dipper stick; and a loading determination unit configured to determine that an operation of the work machine is a loading operation for loading an excavated matter into a loading target under a condition that the bucket moves across a reference level.

Advantageous Effects of Invention

According to the above disclosure, an operation of loading into a loading target can be detected accurately.

BRIEF DESCRIPTION OF DRAWINGS

FIG. 8 is a block diagram for illustrating still another configuration of the hydraulic excavator.

DESCRIPTION OF EMBODIMENTS

Hereinafter, embodiments will now be described with reference to the drawings. It is planned from the beginning to combine and use configurations in embodiments, as appropriate. Some constituent elements may not be used.

In the following, as a work machine, an earthmoving machine will be described as an example. In particular, of such earthmoving machines, a hydraulic excavator which is a work vehicle will be described as an example. Note, however, that the work machine is not limited to an earthmoving machine, and may be a mining machine. In the following description, "upper," "lower," "front," "rear," "right," and "left" are terms with reference to an operator seated on an operator's seat.

Moreover, hereinafter, a dump truck will be referred to as an example of a loading target for loading an excavated matter. However, the loading target is not limited thereto, and may be, for example, a soil container or the like.

<A. Configuration>

Figure 1:
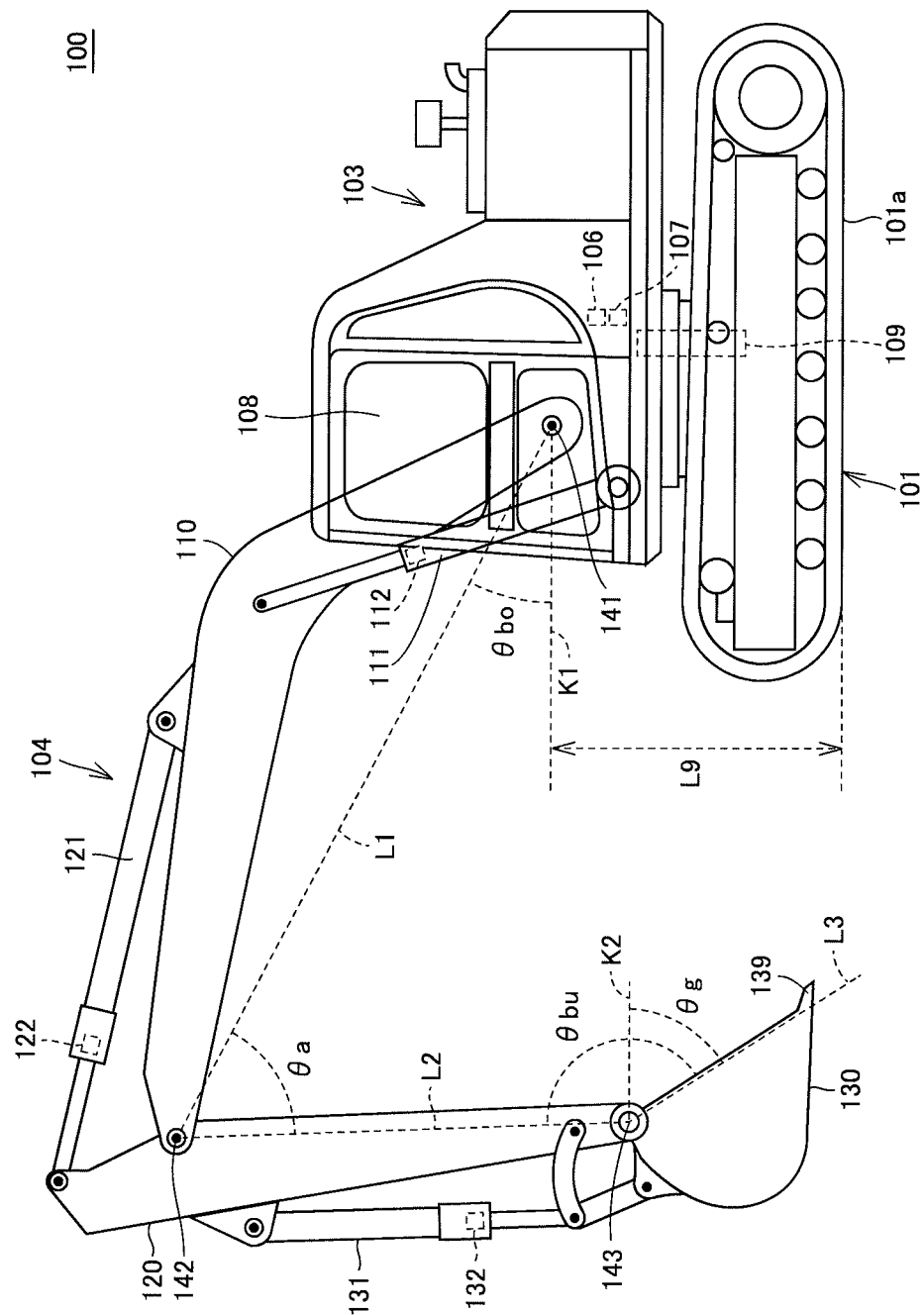
FIG. 1 is a side view schematically showing a configuration of a hydraulic excavator.

FIG. 1 shows a configuration of a hydraulic excavator in a schematic side view.

As shown in FIG. 1, a hydraulic excavator 100 mainly comprises a travel unit 101, a revolving unit 103, and a work implement 104. The body of hydraulic excavator 100 is composed of travel unit 101 and revolving unit 103. The body further has valves 106, 107, and a hydraulic motor 109 for revolution.

Travel unit 101 has right and left, paired crawler belt apparatuses 101a. Right and left, paired crawler belt apparatuses 101a each have a crawler belt. Hydraulic excavator 100 is self-propelled as the right and left, paired crawler belts are rotatably driven.

Revolving unit 103 is disposed to revolvable with respect to travel unit 101 by hydraulic motor 109. Revolving unit 103 has an operator's cab 108. Operator's cab 108 is disposed for example on a forward left side (or the vehicle's front side) of revolving unit 103.

Work implement 104 is pivotally supported on a front side of revolving unit 103 and for example on a right side of operator's cab 108. Work implement 104 has a boom 110, a dipper stick 120, a bucket 130, a boom cylinder 111, a dipper stick cylinder 121, and a bucket cylinder 131.

Boom 110 is attached to revolving unit 103. Boom 110 has a proximal end rotatably coupled with revolving unit 103 by a boom foot pin 141.

Dipper stick 120 is attached to a distal end of boom 110. Dipper stick 120 has a proximal end rotatably coupled with the distal end of boom 110 by a boom distal end pin 142.

Bucket 130 is attached to a distal end of dipper stick 120. Bucket 130 is rotatably coupled with the distal end of dipper stick 120 by a dipper stick distal end pin 143.

Boom 110 can be driven by a boom cylinder 111. This driving allows boom 110 to pivot up and down about boom foot pin 141 with respect to revolving unit 103. Dipper stick 120 can be driven by dipper stick cylinder 121. This driving allows dipper stick 120 to pivot up and down about boom distal end pin 142 with respect to boom 110. Bucket 130 can be driven by bucket cylinder 131. This driving allows bucket 130 to pivot up and down about dipper stick distal end pin 143 with respect to dipper stick 120. Work implement 104 can thus be driven.

Stroke sensors 112, 122, and 132 are attached to boom cylinder 111, dipper stick cylinder 121, and bucket cylinder 131, respectively.

Boom cylinder 111 is driven by hydraulic oil supplied from a hydraulic pressure source (a hydraulic pump and an oil tank not shown) via valve 106.

Valve 106 is a switching valve (a directional control valve) in this example. Valve 106 adjusts the flow rate of the hydraulic oil supplied to boom cylinder 111, based on pilot pressure (PPC pressure). Valve 106 has a spool (not shown). The flow rate of the hydraulic oil supplied to boom cylinder 111 is adjusted as the spool moves to a position depending on the pilot pressure.

Hydraulic excavator 100 comprises a pressure sensor 51 (see FIG. 4) for sensing the pilot pressure.

Hydraulic motor 109 is driven by hydraulic oil supplied from a hydraulic pressure source via valve 107.

Valve 107 is a switching valve (a directional control valve) in this example. Valve 107 adjusts the flow rate of the hydraulic oil supplied to hydraulic motor 109, based on pilot pressure (PPC pressure). Valve 107 has a spool (not shown). The flow rate of the hydraulic oil supplied to hydraulic motor 109 is adjusted as the spool moves to a position depending on the pilot pressure.

Hydraulic excavator 100 comprises a pressure sensor for sensing the pilot pressure. In this example, hydraulic excavator 100 comprises as the pressure sensor a pressure sensor 61 (see FIG. 4) for sensing a pilot pressure applied for performing clockwise revolution and a pressure sensor 62 (see FIG. 4) for sensing a pilot pressure applied for performing counterclockwise revolution.

Further, boom cylinder 111 has a head side and a bottom side each with a pressure sensor (not shown) attached thereto. These pressure sensors sense pressure of hydraulic oil in an oil chamber associated with the head of boom cylinder 111 (i.e., head pressure) and pressure of hydraulic oil in an oil chamber associated with the bottom of boom cylinder 111 (i.e., bottom pressure).

<B. Determination of Whether Loading is Performed>

(b1. Example of Loading Operation)

Figure 2:
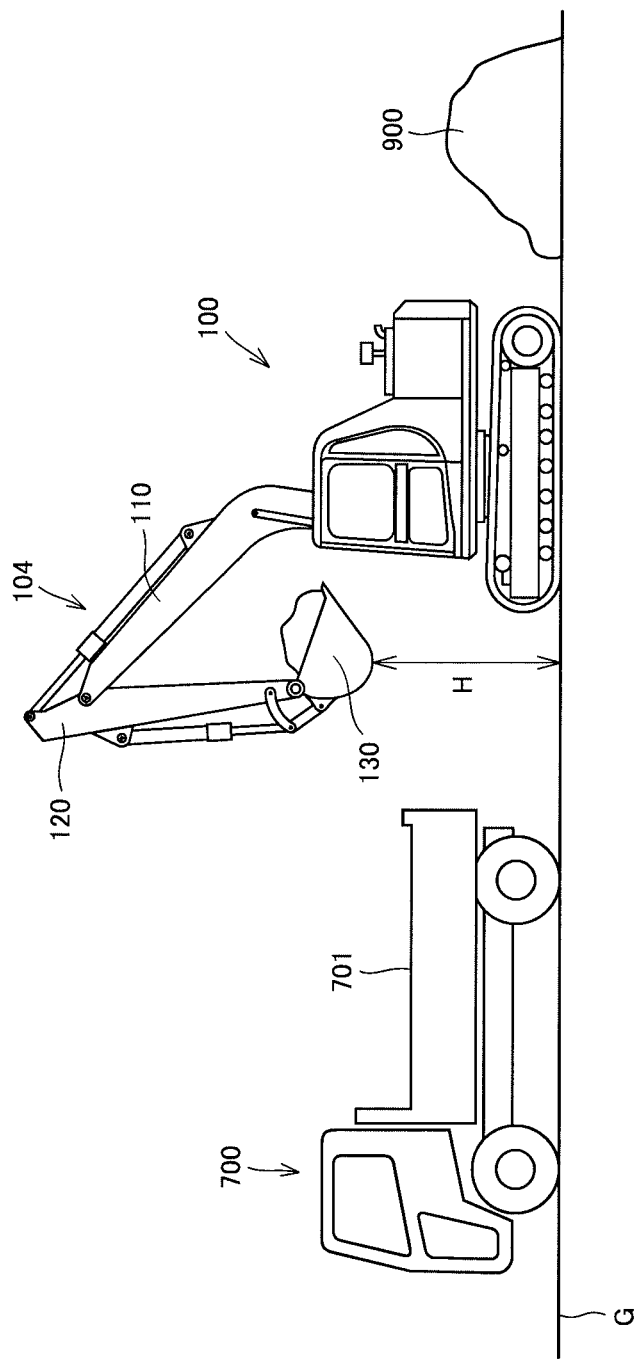
FIG. 2 is a diagram for illustrating a loading operation of loading an excavated matter such as soil into a dump truck.

FIG. 2 is a diagram for illustrating a loading operation of loading an excavated matter such as soil into a dump truck.

As shown in FIG. 2, when loading soil onto a dump bed 701 of a dump truck 700, hydraulic excavator 100 excavates soil from a target to be excavated 900, performs a hoisting and revolving movement by hydraulic motor 109, loads the soil in bucket 130 (or ejects the soil) onto dump bed 701, and performs a descending and revolving movement for subsequent excavation in the stated order.

Hereinafter will be described a logic for determining whether an operation of hydraulic excavator 100 is a loading operation performed to load an excavated matter into a loading target such as dump truck 700.

(b2. Data Characteristics During Loading Operation)

Figure 3:
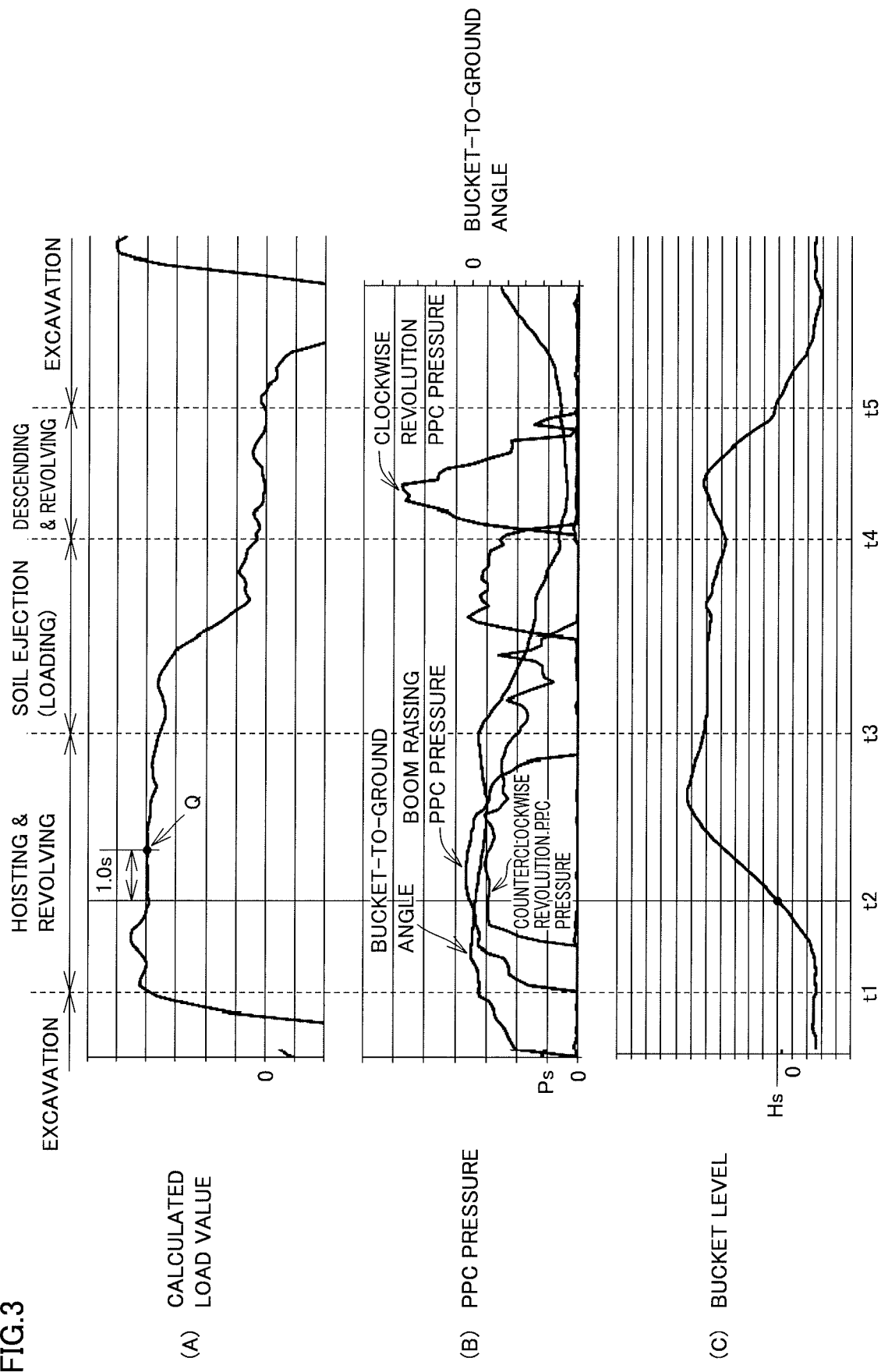
FIG. 3 represents a variety of types of data obtained when an operation is performed to load an excavated matter such as soil into a dump truck.

FIG. 3 represents a variety of types of data obtained when an operation is performed to load an excavated matter such as soil into a dump truck. In each of graphs (A) to (C) of FIG. 3, values along the vertical axis are larger from 0 upwards.

In FIG. 3, graph (A) represents how the weight of a load (a calculated load value) in bucket 130 transitions in a loading operation composed of a series of operations such as excavation, hoisting and revolving, soil ejection, and descending and revolving.

As excavation advances, the amount of the excavated matter in bucket 130 increases, and accordingly, the calculated load value increases. When hoisting and revolving, the amount of the excavated matter in bucket 130 varies little, and accordingly, the calculated load value varies little and is thus substantially constant. When ejecting the soil, the excavated matter is ejected from bucket 130 and accordingly, the calculated load value decreases. When descending and revolving, the amount of the excavated matter in bucket 130 varies little, and accordingly, the calculated load value varies little and is thus substantially constant.

In FIG. 3, graph (B) represents how the pilot pressure for raising boom 110 (hereinafter also referred to as "boom raising PPC pressure"), the pilot pressure for performing clockwise revolution (hereinafter also referred to as "clockwise revolution PPC pressure"), the pilot pressure for performing counterclockwise revolution (hereinafter also referred to as "counterclockwise revolution PPC pressure"), and a bucket-to-ground angle θg transition in the loading operation. The boom raising PPC pressure is a pilot pressure applied to the spool of valve 106 when boom cylinder 111 extends, and it is a hydraulic pressure sensed by pressure sensor 51 (see FIG. 4).

Bucket-to-ground angle θg in this example is defined as an angle formed by an opening plane of bucket 130 and a horizontal plane K2 traversing dipper stick distal end pin 143 and serving as a reference, as shown in FIG. 1. Bucket-to-ground angle θg has a positive value when the bucket has teeth 139 above horizontal plane K2. In FIG. 1, bucket-to-ground angle θg has a negative value.

As shown in FIG. 3 by graph (B), at the time of excavation, bucket-to-ground angle θg gradually approaches 0 degree from a negative value. Excavation is followed by a hoisting and revolving movement (times t1 to t3), when bucket 130 is required to hold the excavated matter, and accordingly, bucket-to-ground angle θg is substantially constant.

In this example, the hoisting and revolving movement is made counterclockwise, and accordingly, when the hoisting and revolving movement is made, the counterclockwise revolution PPC pressure has an increasing value. Further, in order to load the excavated matter onto dump bed 701 of dump truck 700, the operator performs an operation to raise boom 110 when the hoisting and revolving movement is performed. Furthermore, boom 110 ascends, and when bucket 130 attains a level H (i.e., the load's level (see FIG. 2)) having a desired value, the operation of raising the boom is stopped. Accordingly, the boom raising PPC pressure has a value which once increases, and is 0 at the final stage of the hoisting and revolving movement.

Note that level H is a level with hydraulic excavator 100 serving as a reference. In FIG. 2, level H is a distance between the ground G on which hydraulic excavator 100 is located and bucket 130.

The hoisting and revolving movement is followed by soil ejection, (times t3 to t4), when the operator performs an operation to eject the excavated matter from bucket 130, and accordingly, bucket-to-ground angle θg increases in the negative direction. Furthermore, the soil ejection is started before the counterclockwise revolution ends, and accordingly, the counterclockwise revolution PPC pressure holds a positive value up to some intermediate point in the course of the soil ejection. In addition, from some intermediate point in the course of the soil ejection, the operator performs an operation to raise boom 110, and accordingly, the boom raising PPC pressure increases again.

The soil ejection is followed by a descending and revolving movement (times t4 to t5), when the operator performs an operation to revolve revolving unit 103 clockwise to return it to an excavating position, and accordingly, the clockwise revolution PPC pressure has an increasing value. Furthermore, when the descending and revolving movement is made, the operator performs an operation to move boom 110 downward, and accordingly, the boom raising PPC pressure is zero.

In FIG. 3, graph (C) represents how bucket 130 transitions in level H in the loading operation. In the example of FIG. 3, at the time of excavation, bucket 130 is in the ground, and accordingly, level H of bucket 130 has a negative value.

When the excavation is finished and transitions to a hoisting and revolving movement, boom 110 is raised and accordingly, level H of bucket 130 has an increasing value. In the case of graph (C), during the hoisting and revolving movement, level H of bucket 130 reaches a reference level Hs (e.g., 500 mm) at time t2 (t1<t2<t3). Although the details will be described later, reference level Hs is a level referred to in determining whether loading is performed, as will be described later. Reference level Hs is set by the user of hydraulic excavator 100.

At the time of soil ejection (times t3 to t4), level H of bucket 130 is substantially constant. The soil ejection is followed by a descending and revolving movement (times t4 to t5), when boom 110 descends, and accordingly, level H of bucket 130 has a decreasing value.

(b3. Conditions Applied in Determining Whether Loading is Performed)

For hydraulic excavator 100, whether the excavated matter has been loaded into dump truck 700 is determined in view of the characteristics of data in the loading operation as shown in FIG. 3. In this example, it is determined that hydraulic excavator 100 performs the loading operation when the following four conditions are satisfied.

In the following, tn represents any point in time, where n represents a natural number. A period between tn−1 and tn is a calculation period and is fixed regardless of the value of n. A reference pressure Ps is a threshold for pressure.

(α) First Condition

Boom 110 is ascending. In this example, it is determined that boom 110 is ascending when the following expression (1) is satisfied:

$$\text{boom raising } PPC \text{ pressure}(Pbou(tn)) > \text{reference pressure } Ps \quad (1)$$

(β) Second Condition

Revolving unit 103 is revolving. In this example, it is determined that revolving unit 103 is revolving when the following expression (2) or (2') is satisfied:

$$\text{clockwise revolution } PPC \text{ pressure}(Ptr(tn)) > \text{reference pressure } Ps \quad (2)$$

$$\text{counterclockwise revolution } PPC \text{ pressure}(Ptl(tn)) > \text{reference pressure } Ps \quad (2')$$

(γ) Third Condition

Bucket 130 moves across reference level Hs. In this example, it is determined that bucket 130 moves across reference level Hs when the following expression (3) is satisfied:

$$\text{bucket's level } H(tn-1) < \text{reference level } Hs < \text{bucket's level } H(tn) \quad (3)$$

Note that expression (3) is an expression representing that a level of bucket 130 in the immediately previous calculation period, i.e., H(tn−1), is lower than reference level Hs and a level of bucket 130 in the current calculation period, i.e., H(tn), is higher than level Hs.

(δ) Fourth Condition

Bucket 130 assumes a position to hold the excavated matter. In this example, it is determined that bucket 130 is assumes a position to hold the excavated matter when the following expression (4) is satisfied:

$$\text{bucket-to-ground angle } \theta g > -45° \quad (4)$$

Note that bucket-to-ground angle θg is defined by the following expression (5):

$$\theta g = 270° - (\theta bo(tn) + \theta a(tn) + \theta au(tn)) \quad (5)$$

Further, as also shown in FIG. 1, θbo(tn), θa(tn), and θbu(tn) represent a boom angle, a dipper stick angle, and a bucket angle, respectively, at time tn. Note that, as shown in FIG. 1, boom angle θbo(tn) is an angle formed by a horizontal plane K1 and a line segment L1 connecting boom foot pin 141 and boom distal end pin 142. Dipper stick angle θa(tn) is an angle formed by line segment L1 and a line segment L2 connecting boom distal end pin 142 and dipper stick distal end pin 143. Bucket angle θbu(tn) is an angle formed by line segment L2 and the opening plane of bucket 130.

Reference pressure Ps (see graph (2) in FIG. 3) can have a value for example of 0.5 MPa. Reference pressure Ps may have a value for Pbou(tn) and have a different value for Ptr(tn) or Ptl(tn).

In the case of the example of FIG. 3, the above four conditions (the first to fourth conditions) are satisfied only at time t2 in the loading operations (from the start of an excavation through to that of the next excavation (or the end of a descending and revolving movement)).

Whether loading is performed is determined with reference to the above conditions for the following reasons:

The first condition is adopted because the boom is raised when the loading operation is performed. The second condition is adopted because revolving unit 103 is revolved when the loading operation is performed.

The third condition is adopted because bucket 130 moves across reference level Hs when the loading operation is performed. The third condition is also effective for prevention of erroneous determination. When the ground or the like is excavated, the boom is raised, and when the third condition is adopted, the boom raising operation is not determined to be the loading operation.

The fourth condition is adopted to prevent erroneous determination. The fourth condition is adopted for the following reason: when bucket 130 having loaded an excavated matter into dump truck 700 and thus being emptied, and subsequently returning through a hoisting and revolving movement (e.g., hydraulic excavator 100 located at a level higher than dump truck 700) satisfies the first, second and third conditions, it is determined that a loading operation is performed. Without the fourth condition, it would be determined that the loading operation is performed for the second time although in reality it is performed for the first time.

(b4. Exemplary Implementation)

Figure 4:
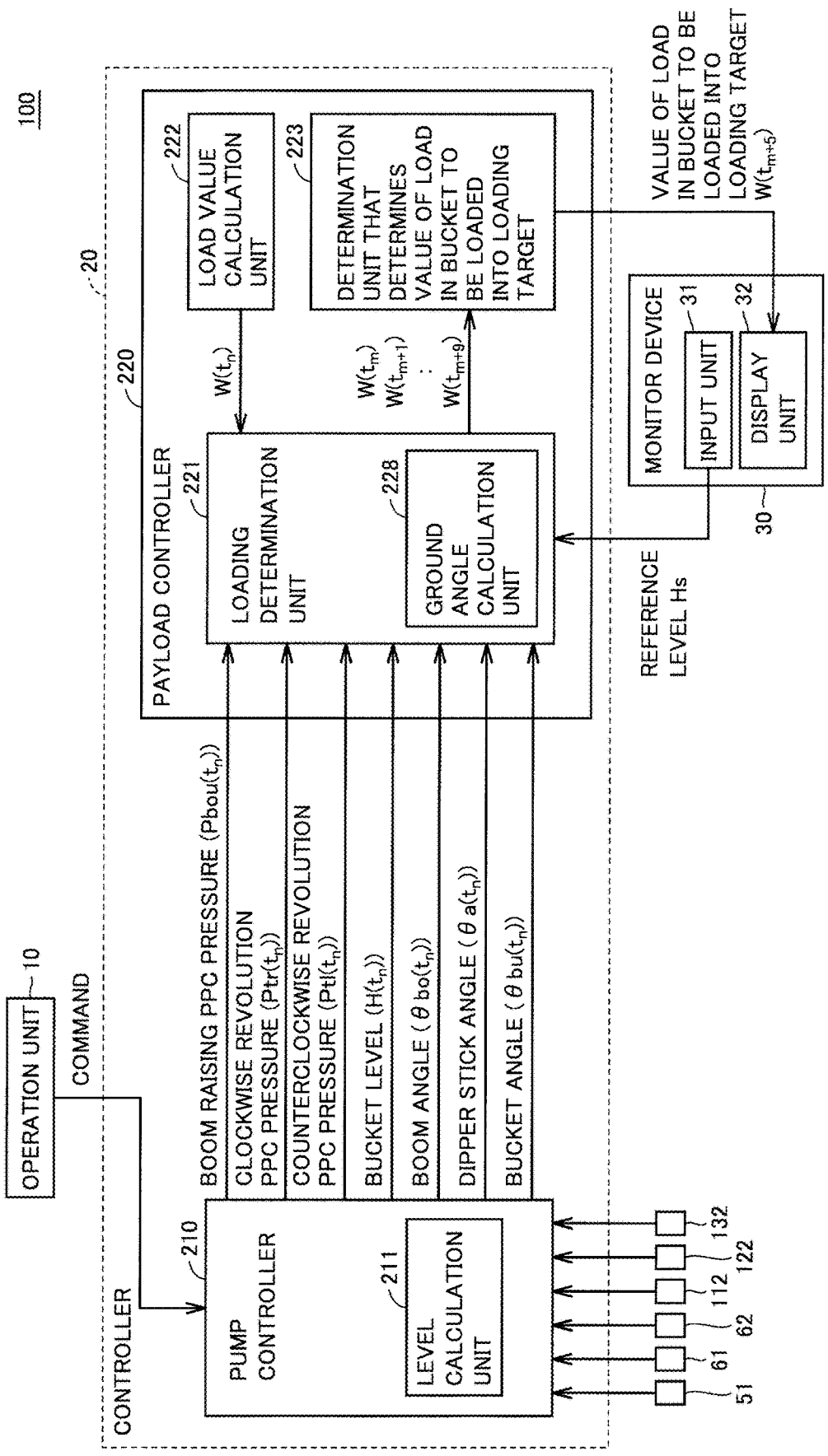
FIG. 4 is a block diagram for illustrating a configuration of a hydraulic excavator.

FIG. 4 is a block diagram for illustrating a configuration of hydraulic excavator 100.

As shown in FIG. 4, hydraulic excavator 100 comprises an operation unit 10, a controller 20, a monitor device 30, pressure sensors 51, 61, 62, and stroke sensors 112, 122, 132.

Operation unit 10 includes a plurality of control levers manipulated to operate work implement 104. Operation unit 10 includes, for example, a control lever for the boom, a control lever for the dipper stick, a control lever for the bucket, a control lever for revolving, and the like. An operation command from operation unit 10 is sent to a pump controller 210 serving as a main controller.

Controller 20 generally controls the operation of hydraulic excavator 100. Controller 20 includes pump controller 210 and a payload controller 220. Pump controller 210 has a level calculation unit 211. Payload controller 220 includes a loading determination unit 221, a load value calculation unit 222, and a determination unit 223 that determines a value of a load in the bucket to be loaded into the loading target. Loading determination unit 221 includes a ground angle calculation unit 228.

Monitor device 30 is a touch screen that receives a touch input and displays a variety of types of information on a monitor. Monitor device 30 includes an input unit 31 and a display unit 32. Input unit 31 can be composed of a touch screen. Display unit 32 is composed of a display. Input unit 31 may be composed of a hard key. Monitor device 30 is an example of a "display device" in the present disclosure, and is also an example of an "input device" in the present disclosure.

Input unit 31 receives an input from the operator for setting reference level Hs. Input unit 31 transmits the received reference level Hs to loading determination unit 221.

Hydraulic excavator 100 receives an input from the operator for setting reference level Hs because hydraulic excavator 100 and dump truck 700 are not necessarily always on the ground of the same level. That is, hydraulic excavator 100 may work at a site higher or lower in level than dump truck 700. Furthermore, hydraulic excavator 100 also receives an input from the operator for setting reference level Hs because the level of dump bed 701 or the level of the frame of dump bed 701 may vary depending on the type of dump truck 700.

Pressure sensors 51, 61, 62 transmit their respective sensed results to pump controller 210. Thus, pump controller 210 obtains boom raising PPC pressure (Pbou(tn)), clockwise revolution PPC pressure (Ptr(tn)), and counterclockwise revolution PPC pressure (Ptl(tn)).

Stroke sensors 112, 122, 132 transmit their respective sensed results to pump controller 210. Thus, pump controller 210 obtains boom angle θbo(tn), dipper stick angle θa(tn), and bucket angle θbu(tn).

Level calculation unit 211 of pump controller 210 calculates level H(tn) of bucket 130.

Pump controller 210 has previously stored therein a level L9 of boom foot pin 141 relative to a lower part of crawler belt apparatus 101a (see FIG. 1). Level calculation unit 211 calculates a level of bucket 130 relative to boom foot pin 141 based on the stroke length of boom cylinder 111, the stroke length of dipper stick cylinder 121, the stroke length of bucket cylinder 131, and the dimensions of work implement 104. Level calculation unit 211 calculates level H(tn) of bucket 130 based on level L9 and the calculated level of bucket 130 relative to boom foot pin 141.

Which portion of bucket 130 is subject to the calculation of level H(tn) of bucket 130 can for example be the lowest portion of bucket 130, as shown in FIG. 2. Further, the position of teeth 139 of bucket 130 can also be subject to the calculation.

Pump controller 210 transmits boom raising PPC pressure (Pbou(tn)), clockwise revolution PPC pressure (Ptr(tn)), counterclockwise revolution PPC pressure (Ptl(tn)), boom angle θbo(tn), dipper stick angle θa(tn), bucket angle θbu(tn), and level H(tn) of bucket 130 to payload controller 220.

Ground angle calculation unit 228 of loading determination unit 221 substitutes boom angle θbo(tn), dipper stick angle θa(tn), and bucket angle θbu(tn) into expression (5) to calculate bucket-to-ground angle θg(tn).

Loading determination unit 221 uses boom raising PPC pressure (Pbou(tn)), clockwise revolution PPC pressure (Ptr(tn)), counterclockwise revolution PPC pressure (Ptl(tn)), bucket-to-ground angle θg(tn), and level H(tn) of bucket 130 to determine whether loading is performed. Based on these five pieces of data, loading determination unit 221 determines whether there arises a state which satisfies the aforementioned four conditions (the first to fourth conditions) at the same time.

Loading determination unit 221 determines that loading is performed when the above four conditions are all satisfied at the same time. If loading determination unit 221 determines that all of the above four conditions are not satisfied, loading determination unit 221 determines that loading is not performed.

As has been set forth above, in the loading operation, the boom is raised and revolving unit 103 is revolved. These operations can be determined by determining whether the first and second conditions are satisfied. Furthermore, in the loading operation, bucket 130 moves across reference level Hs. This operation can be determined according to the third condition. Determining whether the third condition is satisfied can prevent a boom raising operation in excavating the ground or the like from being erroneously determined as a loading operation. Furthermore, determining whether the fourth condition is satisfied can prevent bucket 130 having loaded an excavated matter into dump truck 700 and thus emptied, and thereafter being returned through a hoisting and revolving movement from being determined as a loading operation having been performed.

Hydraulic excavator 100 thus allows an operation of loading into a loading target of dump truck 700 to be detected accurately.

While in the above description whether loading is performed is determined using four conditions (the first to fourth conditions) by way of example, it is not limited as such. Whether loading is performed can be determined using at least the third condition. Whether loading is performed may be determined without using the second condition.

(b5. Summary)

(1) Applying the Third Condition

Hydraulic excavator 100 comprises loading determination unit 221 that determines that an operation of hydraulic excavator 100 is a loading operation for loading an excavated matter into dump truck 700 under a condition that bucket 130 moves across reference level Hs. Such a configuration allows an operation of loading into dump truck 700 to be detected accurately.

(2) Applying the Third Condition and the Fourth Condition

Loading determination unit 221 determines that an operation of hydraulic excavator 100 is the loading operation under a condition that bucket 130 moves across reference level Hs and bucket 130 assumes a position to hold an excavated matter.

As an example of such a determination, loading determination unit 221 further includes ground angle calculation unit 228 that calculates bucket-to-ground angle θg(tn) of bucket 130, and loading determination unit 221 determines that bucket 130 assumes a position to hold an excavated matter under a condition that bucket-to-ground angle θg(tn) falls within a predetermined range (θg>−45°).

Such a configuration allows an operation of loading into dump truck 700 to be detected more accurately than applying the third condition alone.

(3) Applying the Third Condition and the First Condition

Loading determination unit 221 determines that an operation of hydraulic excavator 100 is a loading operation for loading an excavated matter into dump truck 700 under a condition that boom 110 is ascending and bucket 130 moves across reference level Hs. Such a configuration allows an operation of loading into dump truck 700 to be detected more accurately than applying the third condition alone.

In particular, for the first condition, loading determination unit 221 determines that boom 110 is ascending when the boom raising PPC pressure (tn) is higher than reference pressure Ps. Such a configuration allows ascent of boom 110 to be sensed.

Loading determination unit 221 also receives an input from the operator via input unit 31 of monitor device 30 for setting reference level Hs. Such a configuration allows the operator to set reference level Hs while considering a positional relationship between hydraulic excavator 100 and dump truck 700.

Level calculation unit 211 calculates a level of bucket 130 based on the stroke length of boom cylinder 111, the stroke length of dipper stick cylinder 121, and the stroke length of bucket cylinder 131. Hydraulic excavator 100 can thus detect the level of bucket 130. Loading determination unit 221 determines whether bucket 130 moves across reference level Hs, based on the level of bucket 130 calculated.

(4) Applying the Third Condition, the First Condition, and the Fourth Condition

Loading determination unit 221 determines that an operation of hydraulic excavator 100 is the loading operation under a condition that boom 110 is ascending, bucket 130 moves across reference level Hs, and bucket 130 assumes a position to hold an excavated matter.

Such a configuration allows an operation of loading into dump truck 700 to be detected further more accurately than applying the third condition and the first condition (or the fourth condition).

(5) Applying the Third Condition, the First Condition, and the Second Condition

Loading determination unit 221 determines that an operation of hydraulic excavator 100 is the loading operation under a condition that boom 110 is ascending, bucket 130 moves across reference level Hs, and revolving unit 103 is revolving. Such a configuration allows an operation of loading into dump truck 700 to be detected further more accurately than applying the third condition and the first condition.

As an example, loading determination unit 221 determines that revolving unit 103 is revolving when clockwise revolution PPC pressure (Ptr(tn)) is higher than reference pressure Ps. In addition, loading determination unit 221 determines that revolving unit 103 is revolving when counterclockwise revolution PPC pressure (Ptl(tn)) is higher than reference pressure Ps.

(6) Applying the Third Condition, the Fourth Condition, and the Second Condition Loading determination unit 221 determines that an operation of hydraulic excavator 100 is the loading operation under a condition that bucket 130 moves across reference level Hs, bucket 130 assumes a position to hold an excavated matter, and revolving unit 103 is revolving. Such a configuration allows an operation of loading into dump truck 700 to be detected further more accurately than applying the third condition and the fourth condition.

(7) Applying the Third Condition, the First Condition, Second Condition, and the Fourth Condition Loading determination unit 221 determines that an operation of hydraulic excavator 100 is the loading operation under a condition that boom 110 is ascending, bucket 130 moves across reference level Hs, revolving unit 103 is revolving and bucket-to-ground angle θg(tn) falls within a predetermined range (θg>−45°). Such a configuration allows an operation of loading into dump truck 700 to be detected further more accurately than applying the third condition, the first condition and the fourth condition.

<C. Calculation of Value of Load in Bucket to be Loaded into Loading Target>

Once hydraulic excavator 100 has determined that loading is performed, hydraulic excavator 100 performs a processing for determining a load value of bucket 130. Hereinafter, an example of processing for determining a load value will be described.

Payload controller 220, as has been described above, has load value calculation unit 222 and determination unit 223.

Load value calculation unit 222 calculates a load value W(tn) of a load in bucket 130 at time tn. Load value calculation unit 222 uses pressure of hydraulic oil in the oil chamber associated with the head of boom cylinder 111 (i.e., head pressure) and pressure of hydraulic oil in the oil chamber associated with the bottom of boom cylinder 111 (i.e., bottom pressure) to calculate a load value of a load in bucket 130. Load value calculation unit 222 transmits the calculated load value W(tn) to loading determination unit 221. Note that how the load value is calculated is conventionally known, and accordingly, will not be described herein.

In the following, it is assumed that the first to fourth conditions are all satisfied at time tm. In that case, loading determination unit 221 temporarily stores a predetermined number of successive load values W(tm), W(tm+1), W(tm+2), . . . , W(tm+9) after time tm. Loading determination unit 221 transmits the stored load values W(tm), W(tm+1), W(tm+2), . . . , W(tm+9) to determination unit 223.

Determination unit 223 selects one load value from load values W(tm), W(tm+1), W(tm+2), . . . , W(tm+9) based on a predetermined rule, and determines the selected load value as the load value of the load in bucket 130. As an example, determination unit 223 sets as the load value of the load in bucket 130 a load value obtained when a predetermined time has elapsed since time tm (for example at W(tm+5)). The predetermined time is previously set considering a time required for the hoisting and revolving movement. For example, the predetermined time can be one second, as indicated in FIG. 3 by a point Q. Determination unit 223 transmits the determined load value to monitor device 30.

In response to receiving the load value, monitor device 30 displays the load value on display unit 32.

Thus, a highly precise value of the load in the bucket to be loaded into the loading target can be obtained by determining as the value a load value obtained when revolving unit 103 is revolving and a predetermined time has elapsed since the first to fourth conditions were established.

<D. Processing>

Figure 5:
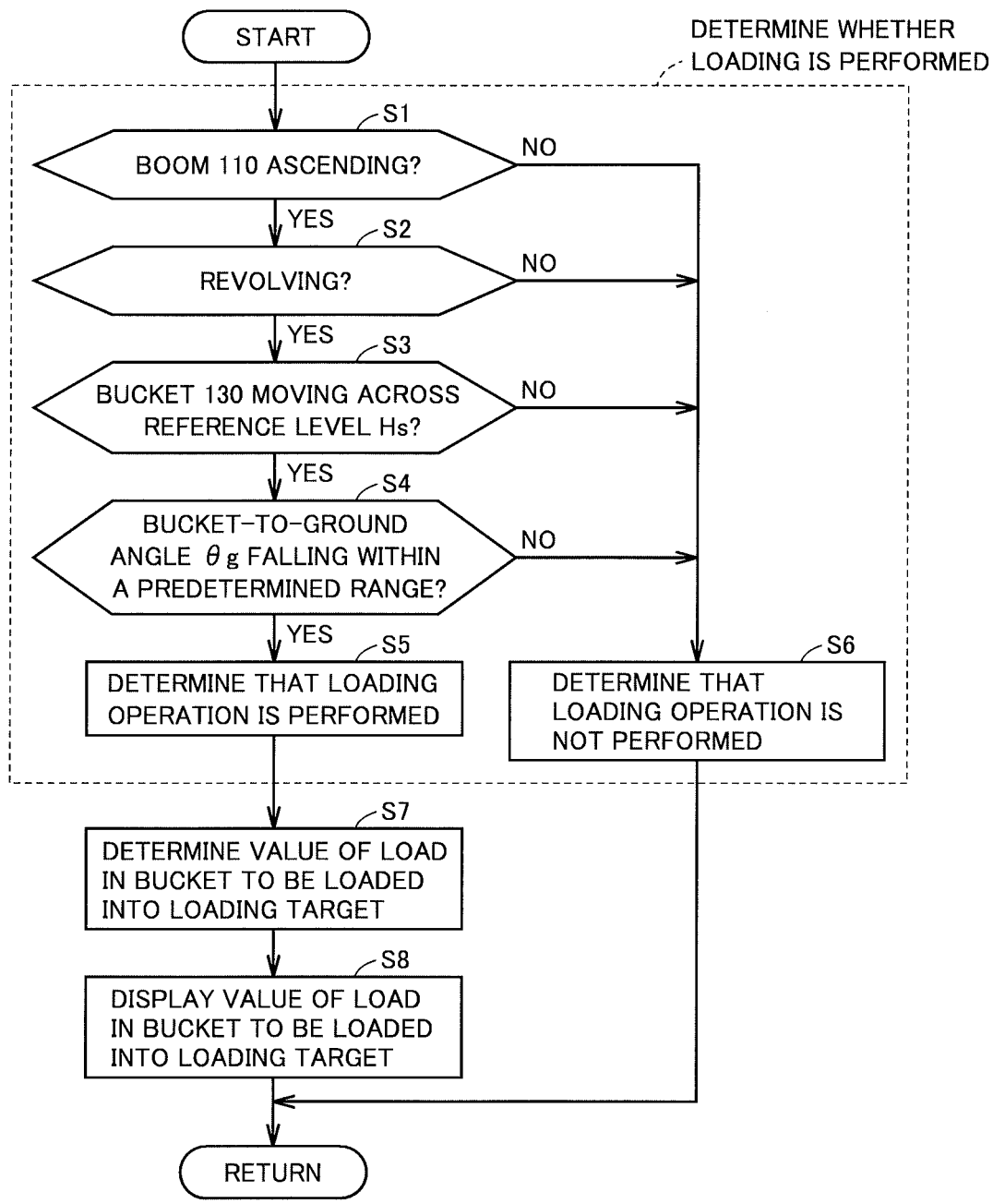
FIG. 5 is a flowchart of a process performed by the hydraulic excavator.

FIG. 5 is a flowchart of a process performed by hydraulic excavator 100.

As shown in FIG. 5, steps S1 to S6 correspond to processing involved in determining whether loading is performed. This example indicates a case where the first to fourth conditions are all used.

Further, in the present example, each determination step indicated as steps S1 to S4 is performed every calculation period ($\Delta t = tn - tn-1$). Further, determination of step S5 and determination of step S6 are performed for every calculation period.

In step S1, loading determination unit 221 of payload controller 220 determines whether boom 110 is ascending based on the boom raising PPC pressure (Pbou(tn)). When it is determined that boom 110 is ascending (YES in step S1), then in step S2 loading determination unit 221 determines whether revolving unit 103 is revolving relative to travel unit 101. When it is determined that boom 110 is not ascending (NO in step S1), then in step S6 loading determination unit 221 determines that the operation of hydraulic excavator 100 is not a loading operation.

When it is determined that revolving unit 103 is revolving (YES in step S2), then in step S3 loading determination unit 221 determines whether bucket 130 moves across reference level Hs as boom 110 ascends. In the present example, loading determination unit 221 determines whether level H(tn-1) and level H(tn) of bucket 130 satisfy the expression (3). When it is determined that revolving unit 103 is not revolving (NO in step S2), loading determination unit 221 determines that the operation of hydraulic excavator 100 is not the loading operation (step S6).

When it is determined that bucket 130 moves across reference level Hs (YES in step S3), then in step S4 loading determination unit 221 determines whether bucket-to-ground angle $\theta g(tn)$ of bucket 130 falls within a predetermined range. When it is determined that bucket 130 does not move across reference level Hs (NO in step S3), loading determination unit 221 determines that the operation of hydraulic excavator 100 is not the loading operation (step S6).

When it is determined that bucket-to-ground angle $\theta g(tn)$ of bucket 130 falls within the predetermined range (YES in step S4), then in step S5 loading determination unit 221 determines that the operation of hydraulic excavator 100 is the loading operation. When it is determined that bucket-to-ground angle $\theta g(tn)$ does not fall within the predetermined range (NO in step S4), loading determination unit 221 determines that the operation of hydraulic excavator 100 is not the loading operation (step S6).

Step S5 is followed by step S7, in which determination unit 223 determines a value of the load in the bucket to be loaded into the loading target. Thereafter, in step S8, the determined value of the load in the bucket to be loaded into the loading target is displayed by display unit 32 of monitor device 30.

<E. Modification>

(Modification of Determining Whether Loading is Performed)

(1) Alternative Method of Applying the First Condition

Figure 6:
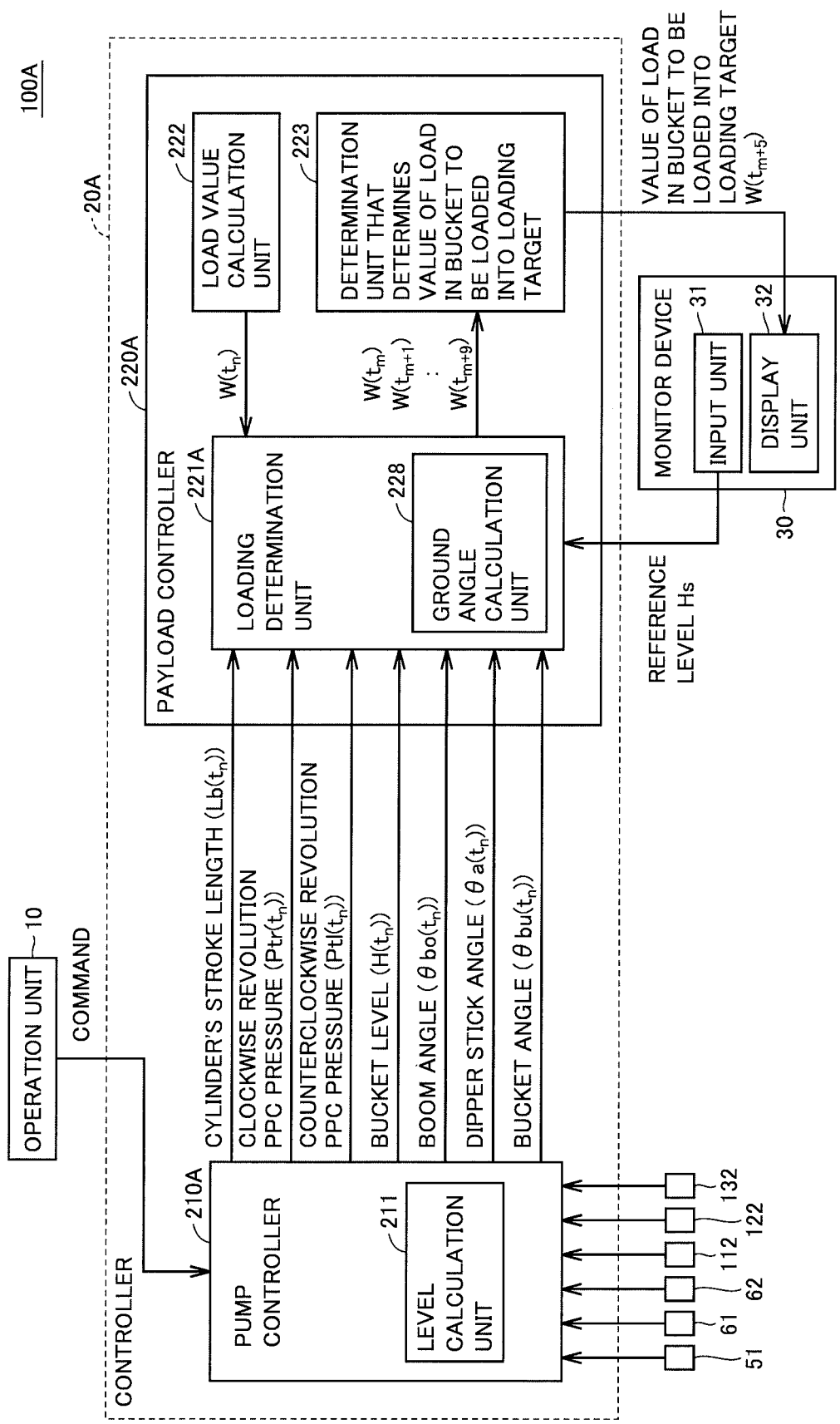
FIG. 6 is a block diagram for illustrating another configuration of the hydraulic excavator.

An alternative method of applying the first condition will be described. FIG. 6 is a block diagram for illustrating a configuration of a hydraulic excavator 100A.

As shown in FIG. 6, hydraulic excavator 100A differs from hydraulic excavator 100 in that the former comprises a controller 20A, a pump controller 210A, a payload controller 220A, and a loading determination unit 221A, whereas the latter comprises controller 20, pump controller 210, payload controller 220 and loading determination unit 221 (see FIG. 4). Hereinafter, how hydraulic excavator 100A specifically differs from hydraulic excavator 100 will be described.

Pump controller 210A does not transmit the boom raising PPC pressure (Pbou(tn)) and instead transmits a stroke length (Lb(tn)) of boom cylinder 111 to payload controller 220A.

Loading determination unit 221A calculates a rate at which the stroke length of boom cylinder 111 changes (or a rate at which the rod moves) based on the stroke length (Lb(tn)). Loading determination unit 221A determines that boom 110 is ascending when the stroke length extends at a rate faster than a reference rate. Such a configuration also allows an operation of loading into a loading target such as dump truck 700 to be detected accurately.

Note that the rate at which the stroke length changes may be calculated in pump controller 210A rather than payload controller 220A.

(2) Alternative Method of Applying the Second Condition

Figure 7:
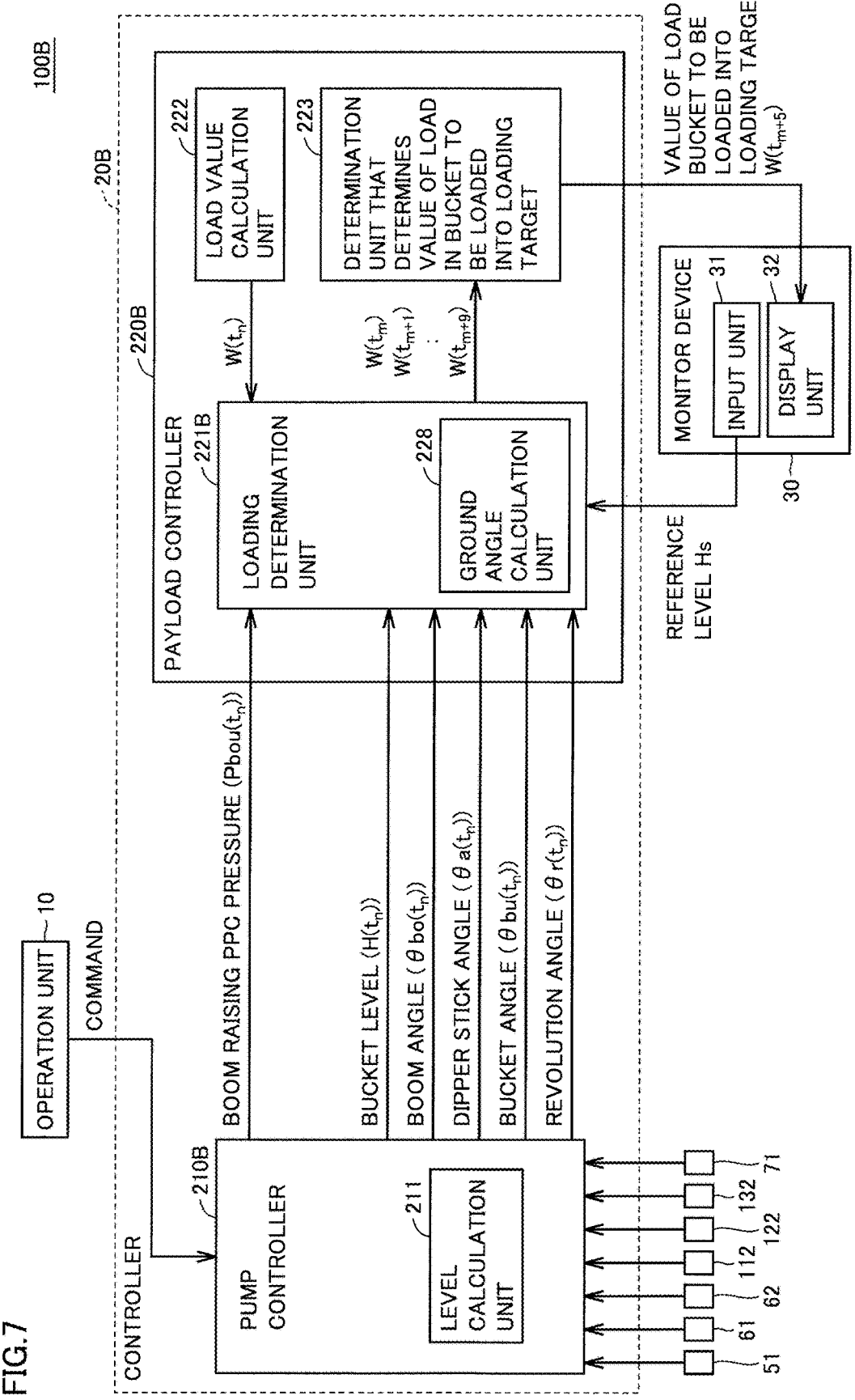
FIG. 7 is a block diagram for illustrating still another configuration of the hydraulic excavator.

An alternative method of applying the second condition will be described. FIG. 7 is a block diagram for illustrating a configuration of a hydraulic excavator 100B.

As shown in FIG. 7, hydraulic excavator 100B differs from hydraulic excavator 100 in that the former comprises a controller 20B, a pump controller 210B, a payload controller 220B, and a loading determination unit 221B, whereas the latter comprises controller 20, pump controller 210, payload controller 220 and loading determination unit 221 (see FIG. 4).

Hydraulic excavator 100B further comprises an angle sensor 71 to sense a revolution angle $\theta r$ of revolving unit 103, and pump controller 210B receives a sensed result from angle sensor 71.

Pump controller 210B transmits to payload controller 220B revolution angle $\theta r(tn)$ rather than clockwise revolution PPC pressure (Ptr(tn)) and counterclockwise revolution PPC pressure (Ptl(tn)).

When revolution angle $\theta r(tn)$ changes as time elapses, loading determination unit 221B determines that revolving unit 103 is revolving. Such a configuration also allows an operation of loading into a loading target such as dump truck 700 to be detected accurately.

Another alternative method of applying the second condition will be described. FIG. 8 is a block diagram for illustrating a configuration of a hydraulic excavator 100C.

As shown in FIG. 8, hydraulic excavator 100C differs from hydraulic excavator 100B in that the former comprises a controller 20C, a payload controller 220C, and a loading determination unit 221C, whereas the latter comprises controller 20B, payload controller 220B and loading determination unit 221B (see FIG. 7).

Loading determination unit 221C has a calculation unit 229. Calculation unit 229 calculates an angular velocity of revolution of revolving unit 103 based on revolution angle $\theta r(tn)$.

When the angular velocity of revolution is equal to or larger than a predetermined angular velocity, loading determination unit 221C determines that revolving unit 103 is revolving. Such a configuration also allows an operation of loading into a loading target such as dump truck 700 to be detected accurately.

(3) Alternative Method of Applying the Fourth Condition

An alternative method of applying the fourth condition will be described. This method employs the load value W(tn) of an excavated matter in bucket 130 as calculated by load value calculation unit 222.

Loading determination unit 221 determines that an operation of hydraulic excavator 100 is the loading operation under a condition that boom 110 is ascending, bucket 130 moves across reference level Hs, and the load value W(tn) is larger than a reference value. As an example, the reference value can be 400 kg.

Such a configuration also allows an operation of loading into a loading target such as dump truck 700 to be detected accurately.

It should be understood that the embodiments disclosed herein are illustrative and not limited to the above disclosure. The scope of the present disclosure is defined by the terms of the claims, and is intended to include any modifications within the meaning and scope equivalent to the terms of the claims.

REFERENCE SIGNS LIST

10 operation unit, 20, 20A, 20B, 20C controller, 30 monitor device, 31 input unit, 32 display unit, 51, 61, 62 pressure sensor, 71 angle sensor, 100, 100A, 100B, 100C hydraulic excavator, 101 travel unit, 101a crawler belt apparatus, 103 revolving unit, 104 work implement, 106, 107 valve, 108 operator's cab, 109 hydraulic motor, 110 boom, 111 boom cylinder, 112, 122, 132 stroke sensor, 120 dipper stick, 121 dipper stick cylinder, 130 bucket, 131 bucket cylinder, 139 teeth 141 boom foot pin, 142 boom distal end pin, 143 dipper stick distal end pin, 210, 210A, 210B pump controller, 211 level calculation unit, 220, 220A, 220B, 220C payload controller 221, 221A, 221B, 221C loading determination unit, 222 load value calculation unit, 223 determination unit that determines a value of a load in the bucket to be loaded into a loading target, 228 ground angle calculation unit, 229 calculation unit, 700 dump truck, 701 dump bed, 900 target to be excavated, G ground, K1, K2 horizontal plane.

The invention claimed is:

1. A work machine comprising:
    a boom;
    a dipper stick attached to a distal end of the boom;
    a bucket attached to a distal end of the dipper stick; and
    a loading determination unit configured to determine that an operation of the work machine is a loading operation for loading an excavated matter into a loading target under a condition that the bucket moves across a reference level and the bucket also assumes a position to hold the excavated matter,
    the loading determination unit further includes a ground angle calculation unit configured to calculate an angle of the bucket relative to ground, and
    the loading determination unit determines that the bucket assumes the position to hold the excavated matter under a condition that the angle relative to the ground falls within a predetermined range.

2. The work machine according to claim 1, wherein the loading determination unit determines that an operation of the work machine is the loading operation under a condition that the bucket moves across the reference level, the bucket assumes the position to hold the excavated matter, and the boom is ascending.

3. The work machine according to claim 2, further comprising:
    a cylinder to drive the boom;
    a valve to adjust, based on pilot pressure, a flow rate of hydraulic oil supplied to theft cylinder; and
    a sensor to sense the pilot pressure,
    wherein the loading determination unit determines that the boom is ascending when the pilot pressure sensed is higher than reference pressure.

4. The work machine according to claim 2, further comprising:
    a cylinder to drive the boom; and
    a sensor to sense a stroke length of the cylinder,
    wherein the loading determination unit determines that the boom is ascending when the stroke length sensed extends at a rate faster than a reference rate.

5. A method for controlling a work machine, comprising:
    detecting that a bucket connected to a boom via a dipper stick moves across a reference level;
    sensing a pilot pressure;
    determining that the boom is ascending when the sensed pilot pressure is higher than a reference pressure; and
    determining that an operation of the work machine is a loading operation for loading an excavated matter into a loading target under a condition that the bucket moves across the reference level and the boom is ascending.

6. A work machine comprising:
    a boom;
    a dipper stick attached to a distal end of the boom;
    a bucket attached to a distal end of the dipper stick;
    a first cylinder to drive the boom;
    a valve to adjust, based on pilot pressure, a flow rate of hydraulic oil supplied to the cylinder;
    a sensor to sense the pilot pressure; and
    a loading determination unit configured to determine that an operation of the work machine is a loading operation for loading an excavated matter into a loading target under a condition that the bucket moves across a reference level and the boom is ascending,
    wherein the loading determination unit determines that the boom is ascending when the pilot pressure sensed is higher than a reference pressure.

7. The work machine according to claim 6, further comprising an input device, wherein the loading determination unit receives an input from an operator via the input device for setting the reference level.

8. The work machine according to claim 6, further comprising:
    a second cylinder to drive the dipper stick;
    a third cylinder to drive the bucket;
    a first sensor to sense a stroke length of the first cylinder;
    a second sensor to sense a stroke length of the second cylinder;
    a third sensor to sense a stroke length of the third cylinder; and
    a level calculation unit configured to calculate a level of the bucket based on the stroke length of the first cylinder as sensed, the stroke length of the second cylinder as sensed, and the stroke length of the third cylinder as sensed,
    wherein the loading determination unit determines, based on the level of the bucket as calculated, whether the bucket moves across the reference level.

9. The work machine according to claim 6, wherein the loading determination unit determines that an operation of the work machine is the loading operation under a condition that the bucket moves across the reference level, the boom is ascending, and the bucket also assumes a position to hold the excavated matter.

10. The work machine according to claim 9, wherein
the loading determination unit further includes a ground angle calculation unit configured to calculate an angle of the bucket relative to ground, and
the loading determination unit determines that the bucket assumes a position to hold the excavated matter under a condition that the angle relative to the ground falls within a predetermined range.

11. The work machine according to claim 6, further comprising:
a load value calculation unit configured to calculate a load value of the excavated matter in the bucket based on a load of the first cylinder,
wherein the loading determination unit determines that an operation of the work machine is the loading operation under a condition that the bucket moves across the reference level, the boom is ascending, and the load value is larger than a reference value.

12. The work machine according to claim 6, further comprising:
a travel unit; and
a revolving unit revolvable with respect to the travel unit and supporting the boom,
wherein the loading determination unit determines that an operation of the work machine is the loading operation under a condition that the bucket moves across the reference level, the boom is ascending, and the revolving unit is revolving.

13. The work machine according to claim 12, further comprising:
a hydraulic motor to revolve the revolving unit;
a valve to adjust, based on pilot pressure, a flow rate of hydraulic oil supplied to the hydraulic motor; and
a sensor to sense the pilot pressure,
wherein the loading determination unit determines that the revolving unit is revolving when the pilot pressure sensed is higher than reference pressure.

14. The work machine according to claim 12, further comprising:
a sensor to sense a revolution angle of the revolving unit,
wherein the loading determination unit determines that the revolving unit is revolving when the revolution angle sensed varies as time elapses.

15. The work machine according to claim 12,
further comprising a sensor to sense a revolution angle of the revolving unit, and
further having an angular velocity calculation unit configured to calculate an angular velocity of revolution based on the revolution angle sensed,
wherein the loading determination unit determines that the revolving unit is revolving when the angular velocity of revolution calculated is equal to or larger than a predetermined angular velocity.

16. The work machine according to claim 6, further comprising:
a travel unit;
a revolving unit revolvable with respect to the travel unit and supporting the boom;
a load value calculation unit configured to calculate a load value of the excavated matter in the bucket based on a load of the first cylinder that drives the boom; and
a determination unit configured to determine as a value of a load in the bucket to be loaded into the loading target a load value of the excavated matter in the bucket that is obtained when the revolving unit is revolving and a predetermined time elapses after the condition has been established.

17. The work machine according to claim 16,
further comprising a display device, and
causing the display device to display the value of the load in the bucket to be loaded into the loading target.

* * * * *